(12) United States Patent
Pickelsimer et al.

(10) Patent No.: US 9,135,334 B2
(45) Date of Patent: Sep. 15, 2015

(54) PROVIDING A SOCIAL NETWORK (75) Inventors: Lisa A. Pickelsimer, Atlanta, GA (US); Joshua Musick, Brooklyn, NY (US); Robert Fabricant, Brooklyn, NY (US); David Werner, San Francisco, CA (US)

(73) Assignee: Cox Communications, Inc., Atlanta, GA (US)

( * ) Notice: Subject to any disclaimer, the term of this patent is extended or adjusted under 35 U.S.C. 154(b) by 403 days.

(21) Appl. No.: 12/126,060

(22) Filed: May 23, 2008

(65) Prior Publication Data

US 2009/0049098 A1 Feb. 19, 2009

Related U.S. Application Data (63) Continuation-in-part of application No. 11/787,732, filed on Apr. 17, 2007, now Pat. No. 8,418,204.

(60) Provisional application No. 60/881,888, filed on Jan. 23, 2007, provisional application No. 60/897,341, filed on Jan. 25, 2007, provisional application No. 60/946,790, filed on Jun. 28, 2007, provisional application No. 60/931,698, filed on May 25, 2007.

(51) Int. Cl.
*G06F 17/30* (2006.01)
*G06F 7/00* (2006.01)
*H04N 7/173* (2011.01)
(Continued)

(52) U.S. Cl.
CPC .... *G06F 17/30781* (2013.01); *G06F 17/30817* (2013.01); *H04N 7/17318* (2013.01); *H04N 21/278* (2013.01); *H04N 21/4788* (2013.01); *H04N 21/6581* (2013.01)

(58) Field of Classification Search
CPC ............... G06F 17/30781; G06F 17/30817; G06F 17/3082
USPC ............... 707/740, 736–737; 705/319
See application file for complete search history.

(56) References Cited

U.S. PATENT DOCUMENTS

| | | | |
|---|---|---|---|
| 5,565,909 A | 10/1996 | Thibadeau et al. | |
| 5,583,560 A | 12/1996 | Florin et al. | |

(Continued)

FOREIGN PATENT DOCUMENTS

JP 2002-218428 8/2002

OTHER PUBLICATIONS

U.S. Final Office Action dated Dec. 30, 2009 cited in U.S. Appl. No. 11/787,732.

(Continued)

*Primary Examiner* — Jeffrey A Burke
(74) *Attorney, Agent, or Firm* — Merchant & Gould P.C.

(57) ABSTRACT

A social network may be provided. First, a content group comprising a list of a plurality of content programs may be received. Next, a user selectable element corresponding to the content group may be made available to a plurality of users. A first request may then be received associated with the user selectable element from a one of the plurality of users. The first request may indicate that the one of the plurality of users wants to receive the content group. Next the content group may be provided to the one of the plurality of users in response to the first request. A second request may then be received from the one of the plurality of users for content corresponding to a one of the plurality of content programs. Then the content may be provided to the one of the plurality of users in response to the second request.

20 Claims, 3 Drawing Sheets (51) Int. Cl.
  *H04N 21/278* (2011.01)
  *H04N 21/4788* (2011.01)
  *H04N 21/658* (2011.01)

(56) References Cited

U.S. PATENT DOCUMENTS

| | | | |
|---|---|---|---|
| 5,808,662 | A | 9/1998 | Kinney et al. |
| 5,812,123 | A | 9/1998 | Rowe et al. |
| 5,818,439 | A | 10/1998 | Nagasaka et al. |
| 5,861,906 | A | 1/1999 | Dunn et al. |
| 6,144,375 | A | 11/2000 | Jain et al. |
| 6,173,317 | B1 | 1/2001 | Chaddha et al. |
| 6,188,398 | B1 | 2/2001 | Collins-Rector et al. |
| 6,282,713 | B1 | 8/2001 | Kitsukawa et al. |
| 6,438,579 | B1* | 8/2002 | Hosken ................ 709/203 |
| 6,615,248 | B1 | 9/2003 | Smith .................. 709/217 |
| 6,754,904 | B1 | 6/2004 | Cooper et al. |
| 6,934,963 | B1 | 8/2005 | Reynolds et al. .......... 725/39 |
| 6,968,364 | B1 | 11/2005 | Wong et al. |
| 6,983,426 | B1 | 1/2006 | Kobayashi et al. |
| 7,017,173 | B1 | 3/2006 | Armstrong et al. |
| 7,080,139 | B1 | 7/2006 | Briggs et al. |
| 7,228,305 | B1 | 6/2007 | Eyal et al. |
| 7,246,367 | B2 | 7/2007 | Livonen |
| 7,249,366 | B1 | 7/2007 | Flavin |
| 7,272,844 | B1 | 9/2007 | Bankers et al. |
| 7,290,211 | B2 | 10/2007 | Goodwin et al. |
| 7,363,644 | B2 | 4/2008 | Wugofski |
| 7,584,214 | B2 | 9/2009 | Narahara et al. ........ 707/104.1 |
| 7,596,761 | B2 | 9/2009 | Lemay et al. ............ 715/779 |
| 7,669,219 | B2 | 2/2010 | Scott, III |
| 7,673,315 | B1 | 3/2010 | Wong et al. |
| 7,685,204 | B2* | 3/2010 | Rogers .................. 707/770 |
| 7,698,263 | B2 | 4/2010 | Pickelsimer et al. |
| 7,716,376 | B1 | 5/2010 | Price et al. |
| 7,877,293 | B2 | 1/2011 | Biebesheimer et al. |
| 7,886,327 | B2 | 2/2011 | Stevens |
| 7,895,625 | B1* | 2/2011 | Bryan et al. ............. 725/46 |
| 7,904,924 | B1* | 3/2011 | de Heer et al. .......... 725/46 |
| 7,933,789 | B2 | 4/2011 | Boland et al. |
| 7,992,163 | B1 | 8/2011 | Jerding et al. |
| 8,090,606 | B2* | 1/2012 | Svendsen .............. 705/7.11 |
| 8,091,032 | B2* | 1/2012 | Fischer ................. 715/751 |
| 8,220,021 | B1 | 7/2012 | Look et al. |
| 8,296,660 | B2* | 10/2012 | Macadaan et al. ........ 715/751 |
| 8,296,803 | B2 | 10/2012 | Yamaoka et al. |
| 8,364,013 | B2 | 1/2013 | Nijim |
| 8,418,204 | B2 | 4/2013 | Pickelsimer et al. |
| 8,789,102 | B2 | 7/2014 | Pickelsimer et al. |
| 8,789,117 | B2 | 7/2014 | Nijim |
| 8,806,532 | B2 | 8/2014 | Pickelsimer et al. |
| 8,832,749 | B2 | 9/2014 | Pickelsimer et al. |
| 8,869,191 | B2 | 10/2014 | Pickelsimer et al. |
| 8,973,049 | B2 | 3/2015 | Pickelsimer et al. |
| 9,071,729 | B2 | 6/2015 | Pickelsimer et al. |
| 2001/0001160 | A1 | 5/2001 | Shoff et al. |
| 2001/0037367 | A1 | 11/2001 | Iyer |
| 2002/0007485 | A1 | 1/2002 | Rodriguez et al. |
| 2002/0056123 | A1 | 5/2002 | Liwerant et al. |
| 2002/0057297 | A1 | 5/2002 | Grimes et al. |
| 2002/0069218 | A1 | 6/2002 | Sull et al. |
| 2002/0087982 | A1 | 7/2002 | Stuart ................... 725/539 |
| 2002/0120757 | A1 | 8/2002 | Sutherland et al. |
| 2002/0124252 | A1 | 9/2002 | Schaefer et al. |
| 2002/0128831 | A1 | 9/2002 | Ju et al. |
| 2002/0144273 | A1 | 10/2002 | Reto |
| 2002/0156852 | A1 | 10/2002 | Hughes et al. |
| 2002/0174430 | A1 | 11/2002 | Ellis et al. |
| 2002/0194195 | A1 | 12/2002 | Fenton et al. ........... 707/104.1 |
| 2002/0199188 | A1 | 12/2002 | Sie et al. |
| 2003/0002849 | A1 | 1/2003 | Lord |
| 2003/0021582 | A1 | 1/2003 | Sawada |
| 2003/0084449 | A1 | 5/2003 | Chane et al. |
| 2003/0093790 | A1 | 5/2003 | Logan et al. |
| 2003/0093806 | A1 | 5/2003 | Dureau et al. |
| 2003/0112467 | A1 | 6/2003 | McCollum et al. |
| 2003/0115592 | A1 | 6/2003 | Johnson |
| 2003/0154477 | A1 | 8/2003 | Hassell et al. |
| 2003/0156827 | A1 | 8/2003 | Janevski |
| 2003/0177497 | A1 | 9/2003 | Macrae et al. |
| 2003/0206710 | A1 | 11/2003 | Ferman et al. |
| 2003/0208763 | A1 | 11/2003 | McElhatten et al. |
| 2003/0220100 | A1 | 11/2003 | McElhatten et al. |
| 2003/0225846 | A1 | 12/2003 | Heikes et al. |
| 2003/0229900 | A1 | 12/2003 | Reisman |
| 2004/0034867 | A1 | 2/2004 | Rashkovskiy et al. ........ 725/40 |
| 2004/0060063 | A1 | 3/2004 | Russ et al. |
| 2004/0064835 | A1 | 4/2004 | Bellwood et al. |
| 2004/0078807 | A1 | 4/2004 | Fries et al. |
| 2004/0078814 | A1 | 4/2004 | Allen |
| 2004/0103167 | A1 | 5/2004 | Grooters et al. |
| 2004/0117786 | A1 | 6/2004 | Kellerman et al. |
| 2004/0210928 | A1 | 10/2004 | Hamzy et al. |
| 2004/0255336 | A1 | 12/2004 | Logan et al. ............ 725/135 |
| 2004/0255340 | A1 | 12/2004 | Logan |
| 2004/0268386 | A1 | 12/2004 | Logan et al. |
| 2005/0022241 | A1 | 1/2005 | Griggs |
| 2005/0028208 | A1 | 2/2005 | Ellis et al. |
| 2005/0044565 | A1 | 2/2005 | Jerding et al. |
| 2005/0055710 | A1 | 3/2005 | Aoki et al. |
| 2005/0076363 | A1 | 4/2005 | Dukes et al. |
| 2005/0091316 | A1 | 4/2005 | Ponce et al. |
| 2005/0149880 | A1 | 7/2005 | Postrel |
| 2005/0210145 | A1 | 9/2005 | Kim et al. |
| 2005/0246739 | A1 | 11/2005 | Davidson |
| 2005/0246752 | A1 | 11/2005 | Liwerant et al. |
| 2005/0251820 | A1 | 11/2005 | Stefanik et al. |
| 2005/0262542 | A1 | 11/2005 | DeWeese et al. |
| 2005/0278443 | A1* | 12/2005 | Winner et al. ............ 709/224 |
| 2005/0278740 | A1 | 12/2005 | Helms .................... 725/41 |
| 2005/0278761 | A1 | 12/2005 | Gonder et al. |
| 2005/0283813 | A1 | 12/2005 | Jamail et al. |
| 2006/0005207 | A1 | 1/2006 | Louch et al. |
| 2006/0008256 | A1 | 1/2006 | Khedouri et al. |
| 2006/0020904 | A1 | 1/2006 | Aaltonen et al. |
| 2006/0031882 | A1 | 2/2006 | Swix et al. |
| 2006/0041927 | A1 | 2/2006 | Stark et al. ............. 725/139 |
| 2006/0059514 | A1 | 3/2006 | Hsiao et al. |
| 2006/0059526 | A1 | 3/2006 | Poslinski |
| 2006/0075019 | A1 | 4/2006 | Donovan et al. |
| 2006/0080408 | A1 | 4/2006 | Istvan et al. ............ 709/219 |
| 2006/0090183 | A1 | 4/2006 | Zito et al. |
| 2006/0112325 | A1 | 5/2006 | Ducheneaut et al. |
| 2006/0130093 | A1 | 6/2006 | Feng et al. |
| 2006/0143236 | A1* | 6/2006 | Wu ..................... 707/104.1 |
| 2006/0161950 | A1 | 7/2006 | Imai et al. |
| 2006/0174277 | A1 | 8/2006 | Sezan et al. |
| 2006/0184972 | A1 | 8/2006 | Rafey et al. |
| 2006/0190966 | A1 | 8/2006 | McKissick et al. |
| 2006/0195479 | A1* | 8/2006 | Spiegelman et al. ...... 707/104.1 |
| 2006/0239131 | A1 | 10/2006 | Nathan et al. |
| 2006/0248557 | A1 | 11/2006 | Stark et al. ............. 725/37 |
| 2006/0253874 | A1* | 11/2006 | Stark et al. ............. 725/62 |
| 2006/0259926 | A1 | 11/2006 | Scheelke et al. |
| 2006/0271959 | A1* | 11/2006 | Jacoby et al. ............ 725/46 |
| 2006/0282856 | A1* | 12/2006 | Errico et al. ............ 725/46 |
| 2007/0033533 | A1 | 2/2007 | Sull |
| 2007/0061835 | A1 | 3/2007 | Klein et al. |
| 2007/0106627 | A1* | 5/2007 | Srivastava et al. .......... 706/20 |
| 2007/0123353 | A1 | 5/2007 | Smith |
| 2007/0124795 | A1 | 5/2007 | McKissick et al. |
| 2007/0150918 | A1 | 6/2007 | Carpenter et al. |
| 2007/0186180 | A1 | 8/2007 | Morgan |
| 2007/0186231 | A1 | 8/2007 | Haeuser et al. |
| 2007/0186243 | A1* | 8/2007 | Pettit et al. ............. 725/46 |
| 2007/0198532 | A1 | 8/2007 | Krikorian et al. |
| 2007/0204238 | A1 | 8/2007 | Hua et al. |
| 2007/0214473 | A1 | 9/2007 | Barton et al. |
| 2007/0220552 | A1 | 9/2007 | Juster et al. |
| 2007/0220566 | A1* | 9/2007 | Ahmad-Taylor ........... 725/89 |
| 2007/0245367 | A1 | 10/2007 | Ogawa |
| 2007/0256103 | A1 | 11/2007 | Knudson |
| 2007/0271338 | A1 | 11/2007 | Anschutz |
| 2007/0277205 | A1 | 11/2007 | Grannan |

(56) References Cited

U.S. PATENT DOCUMENTS

| | | | |
|---|---|---|---|
| 2007/0282949 A1* | 12/2007 | Fischer et al. | 709/204 |
| 2007/0294726 A1 | 12/2007 | Drazin | |
| 2007/0298401 A1 | 12/2007 | Mohanty et al. | |
| 2008/0010153 A1* | 1/2008 | Pugh-O'Connor et al. | 705/14 |
| 2008/0022320 A1 | 1/2008 | Ver Steeg | |
| 2008/0036917 A1 | 2/2008 | Pascarella et al. | |
| 2008/0040370 A1* | 2/2008 | Bosworth et al. | 707/101 |
| 2008/0052371 A1* | 2/2008 | Partovi et al. | 709/217 |
| 2008/0065758 A1 | 3/2008 | Narayanaswami | |
| 2008/0066111 A1 | 3/2008 | Ellis et al. | |
| 2008/0066114 A1 | 3/2008 | Carlson et al. | |
| 2008/0082606 A1 | 4/2008 | Gupta et al. | |
| 2008/0086456 A1 | 4/2008 | Rasanen et al. | |
| 2008/0092168 A1 | 4/2008 | Logan et al. | |
| 2008/0098323 A1 | 4/2008 | Vallone et al. | |
| 2008/0114861 A1* | 5/2008 | Gildred | 709/219 |
| 2008/0126936 A1 | 5/2008 | Williams | 715/17 |
| 2008/0137756 A1 | 6/2008 | Scherlis et al. | |
| 2008/0155600 A1 | 6/2008 | Klappert et al. | 725/44 |
| 2008/0163307 A1 | 7/2008 | Coburn et al. | 725/61 |
| 2008/0168506 A1 | 7/2008 | Pickelsimer | |
| 2008/0168515 A1* | 7/2008 | Benson et al. | 725/110 |
| 2008/0177727 A1 | 7/2008 | Pickelsimer | |
| 2008/0178218 A1 | 7/2008 | Pickelsimer | |
| 2008/0235733 A1 | 9/2008 | Heie et al. | |
| 2008/0247730 A1 | 10/2008 | Barton et al. | |
| 2008/0256129 A1 | 10/2008 | Salinas et al. | |
| 2008/0263595 A1 | 10/2008 | Sumiyoshi et al. | 725/39 |
| 2008/0276278 A1 | 11/2008 | Krieger et al. | 725/40 |
| 2008/0288596 A1* | 11/2008 | Smith et al. | 709/206 |
| 2008/0313541 A1 | 12/2008 | Shafton et al. | |
| 2008/0320139 A1 | 12/2008 | Fukuda et al. | |
| 2009/0019374 A1 | 1/2009 | Logan et al. | |
| 2009/0044216 A1 | 2/2009 | McNicoll | |
| 2009/0049118 A1 | 2/2009 | Stevens | |
| 2009/0049473 A1 | 2/2009 | Pickelsimer et al. | |
| 2009/0055743 A1 | 2/2009 | Pickelsimer et al. | |
| 2009/0055868 A1 | 2/2009 | Wehmeyer et al. | |
| 2009/0063994 A1 | 3/2009 | Pickelsimer et al. | |
| 2009/0094643 A1 | 4/2009 | Pickelsimer et al. | |
| 2009/0100469 A1* | 4/2009 | Conradt et al. | 725/46 |
| 2009/0125843 A1 | 5/2009 | Billmaier et al. | |
| 2009/0162024 A1 | 6/2009 | Bradicich et al. | |
| 2009/0172127 A1* | 7/2009 | Srikanth et al. | 709/217 |
| 2009/0172543 A1 | 7/2009 | Cronin et al. | |
| 2009/0178081 A1 | 7/2009 | Goldenberg et al. | |
| 2009/0199242 A1 | 8/2009 | Johnson et al. | |
| 2009/0307719 A1 | 12/2009 | Clark et al. | |
| 2009/0310933 A1 | 12/2009 | Lee | |
| 2009/0313664 A1 | 12/2009 | Patil et al. | |
| 2010/0042746 A1 | 2/2010 | Keum et al. | |
| 2010/0064320 A1 | 3/2010 | Angiolillo et al. | |
| 2010/0107194 A1 | 4/2010 | McKissick et al. | |
| 2010/0175084 A1 | 7/2010 | Ellis et al. | |
| 2010/0192173 A1 | 7/2010 | Mizuki et al. | |
| 2010/0263011 A1 | 10/2010 | McMurtrie | |
| 2011/0010744 A1 | 1/2011 | Stecyk et al. | |
| 2011/0013885 A1 | 1/2011 | Wong et al. | |
| 2011/0072455 A1 | 3/2011 | Pickelsimer et al. | |
| 2011/0090402 A1* | 4/2011 | Huntington et al. | 348/564 |
| 2011/0107389 A1 | 5/2011 | Chakarapani | |
| 2011/0131600 A1 | 6/2011 | Howcroft et al. | |
| 2011/0138423 A1 | 6/2011 | Pickelsimer et al. | |
| 2011/0202945 A1 | 8/2011 | Pickelsimer et al. | |
| 2011/0283313 A1 | 11/2011 | Gathen et al. | |
| 2012/0051717 A1 | 3/2012 | Nijim | |
| 2012/0054808 A1 | 3/2012 | Nijim | |
| 2012/0054810 A1 | 3/2012 | Nijim | |
| 2012/0222056 A1 | 8/2012 | Donoghue et al. | |
| 2012/0284744 A1 | 11/2012 | Kumar | |
| 2013/0167168 A1 | 6/2013 | Ellis et al. | |
| 2014/0242285 A1 | 8/2014 | Pettersson et al. | |

OTHER PUBLICATIONS

U.S. Office Action dated Apr. 28, 2009 cited in U.S. Appl. No. 11/787,733.

U.S. Appl. No. 11/651,140, filed Jan. 9, 2007 entitled "Providing User Communication".

U.S. Appl. No. 11/787,732, filed Apr. 17, 2007 entitled "Providing a Video User Interface".

U.S. Appl. No. 11/787,733, filed Apr. 17, 2007 entitled "Providing a Lateral Search".

J. Bouwen et al., "Communication Meets Entertainment: Community Television," Technology White Paper, Alcatel Telecommunications Review, 1$^{st}$ Quarter 2005, pp. 1-8, http://www.alcatel.com/doctypes/articlepaperlibrary/pdf/ATR2005Q1/T0503-Community_TV-EN.pdf.

U.S. Office Action dated Jun. 22, 2009 cited in U.S. Appl. No. 11/787,732.

U.S. Appl. No. 12/126,025, filed May 23, 2008 entitled "Providing a Video User Interface".

U.S. Appl. No. 12/126,126, filed May 23, 2008 entitled "Providing a User Interface".

U.S. Appl. No. 12/126,096, filed May 23, 2008 entitled "Providing a Content Mark".

U.S. Appl. No. 12/126,165, filed May 23, 2008 entitled "Providing a Customized User Interface".

Copending U.S. Appl. No. 12/545,099, filed Aug. 21, 2009 entitled "Providing a Video User Interface".

Copending U.S. Appl. No. 12/959,731, filed Dec. 3, 2010 entitled "Providing a Media Guide Including Parental Information".

Copending U.S. Appl. No. 12/959,665, filed Dec. 3, 2010 entitled "Content Recommendations".

Copending U.S. Appl. No. 12/959,793, filed Dec. 3, 2010 entitled "Personalizing TV Content".

U.S. Final Office Action dated Jan. 14, 2011 cited in U.S. Appl. No. 12/126,096.

Copending U.S. Appl. No. 12/868,801, filed Aug. 26, 2010 entitled "Content Library".

Copending U.S. Appl. No. 12/868,824, filed Aug. 26, 2010 entitled "Playlist Bookmarking".

Copending U.S. Appl. No. 12/868,838, filed Aug. 26, 2010 entitled "Content Bookmarking".

U.S. Office Action dated Sep. 14, 2010 cited in U.S. Appl. No. 11/651,140.

U.S. Office Action dated Sep. 14, 2010 cited in U.S. Appl. No. 11/787,732.

U.S. Office Action dated Sep. 30, 2010 cited in U.S. Appl. No. 12/126,165.

U.S. Office Action dated Oct. 5, 2010 cited in U.S. Appl. No. 12/126,096.

U.S. Final Office Action dated Dec. 22, 2010 cited in U.S. Appl. No. 11/651,140.

U.S. Office Action dated Feb. 14, 2011 cited in U.S. Appl. No. 12/126,025.

U.S. Office Action dated Feb. 18, 2011 cited in U.S. Appl. No. 12/545,099.

U.S. Office Action dated Feb. 28, 2011 cited in U.S. Appl. No. 11/651,140.

U.S. Office Action dated Mar. 2, 2011 cited in U.S. Appl. No. 11/787,732.

U.S. Final Office Action dated Mar. 2, 2011 cited in U.S. Appl. No. 12/126,165.

U.S. Office Action dated Apr. 26, 2011 cited in U.S. Appl. No. 12/126,096.

U.S. Office Action dated Dec. 28, 2011 cited in U.S. Appl. No. 12/545,099, 13 pgs.

U.S. Office Action dated Jan. 5, 2012 cited in U.S. Appl. No. 12/126,096, 20 pgs.

U.S. Office Action dated Jan. 18, 2012 cited in U.S. Appl. No. 12/126,025, 27 pgs.

U.S. Office Action dated Jan. 19, 2012 cited in U.S. Appl. No. 12/126,165, 20 pgs.

U.S. Office Action dated Jan. 19, 2012 cited in U.S. Appl. No. 11/651,140, 21 pgs.

(56) References Cited

OTHER PUBLICATIONS

U.S. Office Action dated Jun. 7, 2011 cited in U.S. Appl. No. 11/651,140.
U.S. Final Office Action dated Jun. 21, 2011 cited in U.S. Appl. No. 12/126,025.
U.S. Final Office Action dated Aug. 5, 2011 cited in U.S. Appl. No. 12/545,099.
U.S. Final Office Action dated Sep. 27, 2011 cited in U.S. Appl. No. 11/651,140.
U.S. Appl. No. 13/221,151, filed Aug. 30, 2011 entitled "Sharing Digitally Recorded Content".
U.S. Final Office Action dated Sep. 29, 2011 cited in U.S. Appl. No. 12/126,096.
U.S. Final Office Action dated May 31, 2012 cited in U.S. Appl. No. 12/126,165, 23 pgs.
U.S. Office Action dated Jun. 5, 2012 cited in U.S. Appl. No. 12/126,126, 40 pgs.
U.S. Office Action dated Jun. 20, 2012 cited in U.S. Appl. No. 12/959,731, 30 pgs.
U.S. Final Office Action dated Apr. 20, 2012 cited in U.S. Appl. No. 12/126,096, 25 pgs.
U.S. Final Office Action dated Apr. 25, 2012 cited in U.S. Appl. No. 12/545,099, 16 pgs.
U.S. Final Office Action dated Apr. 25, 2012 cited in U.S. Appl. No. 11/651,140, 21 pgs.
U.S. Office Action dated May 21, 2012 cited in U.S. Appl. No. 12/868,838, 22 pgs.
U.S. Office Action dated May 22, 2013 cited in U.S. Appl. No. 11/651,140, 20 pgs.
U.S. Office Action dated Jun. 20, 2013 cited in U.S. Appl. No. 12/126,126, 27 pgs.
U.S. Final Office Action dated Aug. 1, 2013 cited in U.S. Appl. No. 12/959,731, 23 pgs.
U.S. Final Office Action dated Aug. 14, 2013 cited in U.S. Appl. No. 12/959,665, 30 pgs.
U.S. Office Action dated Aug. 16, 2013 cited in U.S. Appl. No. 12/868,801, 13 pgs.
U.S. Office Action dated Sep. 13, 2012 cited in U.S. Appl. No. 11/651,140, 23 pgs.
U.S. Office Action dated Oct. 4, 2012 cited in U.S. Appl. No. 12/868,801, 27 pgs.
U.S. Office Action dated Oct. 5, 2012 cited in U.S. Appl. No. 12/959,793, 31 pgs.
U.S. Office Action dated Oct. 9, 2012 cited in U.S. Appl. No. 12/545,099, 21 pgs.
U.S. Final Office Action dated Oct. 9, 2012 cited in U.S. Appl. No. 12/959,731, 19 pgs.
U.S. Office Action dated Oct. 24, 2012 cited in U.S. Appl. No. 12/126,165, 25 pgs.
U.S. Office Action dated Nov. 5, 2012 cited in U.S. Appl. No. 12/126,096, 23 pgs.
U.S. Office Action dated Nov. 20, 2012 cited in U.S. Appl. No. 13/221,151, 29 pgs.
U.S. Office Action dated Nov. 29, 2012 cited in U.S. Appl. No. 12/868,824, 33 pgs.
U.S. Final Office Action dated Feb. 26, 2013 cited in U.S. Appl. No. 11/651,140, 21 pgs.
U.S. Final Office Action dated Mar. 1, 2013 cited in U.S. Appl. No. 13/221,151, 15 pgs.
U.S. Final Office Action dated Mar. 27, 2013 cited in U.S. Appl. No. 12/126,096, 25 pgs.
U.S. Office Action dated Apr. 3, 2013 cited in U.S. Appl. No. 12/959,665, 45 pgs.
U.S. Final Office Action dated Apr. 10, 2013 cited in U.S. Appl. No. 12/959,793, 23 pgs.
U.S. Office Action dated Apr. 11, 2013 cited in U.S. Appl. No. 12/959,731, 22 pgs.
U.S. Final Office Action dated Apr. 11, 2013 cited in U.S. Appl. No. 12/126,025, 28 pgs.
U.S. Final Office Action dated Apr. 25, 2013 cited in U.S. Appl. No. 12/126,165, 26 pgs.
U.S. Final Office Action dated Apr. 30, 2013 cited in U.S. Appl. No. 12/868,801, 13 pgs.
U.S. Final Office Action dated May 3, 2013 cited in U.S. Appl. No. 12/545,099, 20 pgs.
U.S. Office Action dated May 14, 2013 cited in U.S. Appl. No. 12/868,824, 12 pgs.
U.S. Final Office Action dated Aug. 15, 2012 cited in U.S. Appl. No. 12/126,025, 33 pgs.
U.S. Final Office Action dated Aug. 29, 2012 cited in U.S. Appl. No. 12/868,838, 7 pgs.
U.S. Office Action dated Dec. 19, 2012 cited in U.S. Appl. No. 12/126,025, 30 pgs.
U.S. Final Office Action dated Dec. 28, 2012 cited in U.S. Appl. No. 12/126,126, 24 pgs.
U.S. Office Action dated Oct. 4, 2013 cited in U.S. Appl. No. 12/126,165, 28 pgs.
U.S. Office Action dated Oct. 7, 2013 cited in U.S. Appl. No. 12/959,793, 27 pgs.
U.S. Final Office Action dated Oct. 10, 2013 cited in U.S. Appl. No. 12/126,126, 23 pgs.
U.S. Final Office Action dated Oct. 28, 2013 cited in U.S. Appl. No. 11/651,140, 19 pgs.
U.S. Final Office Action dated Nov. 1, 2013 cited in U.S. Appl. No. 12/868,824, 15 pgs.
U.S. Final Office Action dated Dec. 24, 2013 cited in U.S. Appl. No. 13/221,151, 17 pgs.
U.S. Final Office Action dated Jan. 9, 2014 cited in U.S. Appl. No. 12/126,096, 26 pgs.
U.S. Office Action dated May 20, 2014 cited in U.S. Appl. No. 12/126,096, 19 pgs.
U.S. Office Action dated May 21, 2014 cited in U.S. Appl. No. 13/221,151, 18 pgs.
U.S. Final Office Action dated Sep. 24, 2014 cited in U.S. Appl. No. 12/868,824, 28 pgs.
U.S. Final Office Action dated Aug. 27, 2014 cited in U.S. Appl. No. 12/126,096, 38 pgs.
U.S. Final Office Action dated Sep. 3, 2014 cited in U.S. Appl. No. 13/221,151, 31 pgs.
U.S. Office Action dated Feb. 24, 2015 cited in U.S. Appl. No. 12/868,824, 24 pgs.
U.S. Office Action dated Mar. 6, 2014 cited in U.S. Appl. No. 12/959,731, 16 pgs.
U.S. Office Action dated Mar. 18, 2014 cited in U.S. Appl. No. 11/651,140, 18 pgs.
U.S. Office Action dated Mar. 21, 2014 cited in U.S. Appl. No. 12/868,824, 12 pgs.
U.S. Office Action dated Mar. 4, 2015 cited in U.S. Appl. No. 13/221,151, 26 pgs.
U.S. Office Action dated Aug. 21, 2013 cited in U.S. Appl. No. 12/126,096, 23 pgs.
U.S. Office Action dated Sep. 9, 2013 cited in U.S. Appl. No. 13/221,151, 16 pgs.
U.S. Office Action dated May 28, 2015 cited in U.S. Appl. No. 12/126,096, 46 pgs.
U.S. Final Office Action dated Jun. 19, 2015 cited in U.S. Appl. No. 13/221,151, 21 pgs.

* cited by examiner

PROVIDING A SOCIAL NETWORK

RELATED APPLICATIONS

Under provisions of 35 U.S.C. §119(e), applicants claim the benefit of U.S. Provisional Application No. 60/946,790, filed Jun. 28, 2007, and U.S. Provisional Application No. 60/931,698, filed May 25, 2007, both of which are hereby incorporated by reference.

This application is a continuation-in-part (CIP) of U.S. application Ser. No. 11/787,732, filed Apr. 17, 2007, which is incorporated herein by reference. U.S. application Ser. No. 11/787,732, filed Apr. 17, 2007, claimed the benefit of U.S. Provisional Application No. 60/881,888, filed Jan. 23, 2007, and U.S. Provisional Application No. 60/897,341, filed Jan. 25, 2007, under provisions of 35 U.S.C. §119(e).

Related U.S. application Ser. No. 11/651,140, filed on Jan. 9, 2007, and U.S. application Ser. No. 11/787,733, filed on Apr. 17, 2007 are hereby incorporated by reference.

Related U.S. application Ser. No. 12/126,025, entitled "PROVIDING A VIDEO USER INTERFACE" (60136.0036USI1), U.S. application Ser. No. 12/126,096, entitled "PROVIDING A CONTENT MARK" (60136.0036USI3), U.S. application Ser. No. 12/126,126, entitled "PROVIDING A USER INTERFACE" (60136.0036USI4), and U.S. application Ser. No. 12/126,165, entitled "PROVIDING A CUSTOMIZED USER INTERFACE" (60136.0036USI5), filed on even date herewith in the name of Lisa A. Pickelsimer et al., assigned to the assignee of the present application, are also hereby incorporated by reference.

BACKGROUND

Service providers may deliver content to a user over a content delivery system. For example, conventional content delivery systems distribute the content to a first user and a second user independently. In other words, the first user may watch a sports program while the second user may simultaneously watch a video-on-demand program. Independent content use, however, does not create a socialized entertainment sense with the users. Consequently, the first user may be socially detached and isolated from the second user. Stated another way, the conventional content delivery system may present an impersonal and unsocial user experience.

SUMMARY

Consistent with embodiments of the present invention, a social network may be provided. First, a content group comprising a list of a plurality of content programs may be received. Next, a user selectable element corresponding to the content group may be made available to a plurality of users. A first request may then be received associated with the user selectable element from a one of the plurality of users. The first request may indicate that the one of the plurality of users wants to receive the content group. Next the content group may be provided to the one of the plurality of users in response to the first request. A second request may then be received from the one of the plurality of users for content corresponding to a one of the plurality of content programs. Then the content may be provided to the one of the plurality of users in response to the second request.

Both the foregoing general description and the following detailed description are examples and explanatory only, and should not be considered to restrict the invention's scope, as described and claimed. Further, features and/or variations may be provided in addition to those set forth herein. For example, embodiments of the invention may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Service providers may deliver content to users over a content delivery system independently. For example, a first user may receive a sports program from the content delivery system while a second user may simultaneously receive a video-on-demand program from the content delivery system. Independent content use by the users, however, does not create a socialized entertainment experience. Consistent with embodiments of the invention, a social network may be provided. First, a request may be received, by a service provider from a subject comprising a subscriber to the social network, to send invitations to a plurality of individuals. The invitations may be directed toward inviting each one of the plurality of individuals to be included in the plurality of users (e.g. social network.) Then the invitations may be sent by the service provider and responses to the invitations may be received. The plurality of individuals may then be included in the plurality of users based upon the received responses. The plurality of users may be considered members of the social network when they answer the invitations affirmatively.

Once the social network's members (e.g. plurality of users) are established, a content group comprising a list of a plurality of content programs (e.g. television shows, movies, broadcast programming, VOD programming, music, and any content available over the internet) may be received by the service provider. Next, a user selectable element corresponding to the content group may be made available to the plurality of users. A first request may then be received, by the service provider, associated with the user selectable element from a one of the plurality of users. The first request may indicate that the one of the plurality of users wants to receive the content group. Next the content group may be provided by the service provider to the one of the plurality of users in response to the first request. A second request may then be received by the service provider from the one of the plurality of users for content corresponding to a one of the plurality of content programs.

Then the content may be provided by the service provider to the one of the plurality of users in response to the second request.

Figure 1:
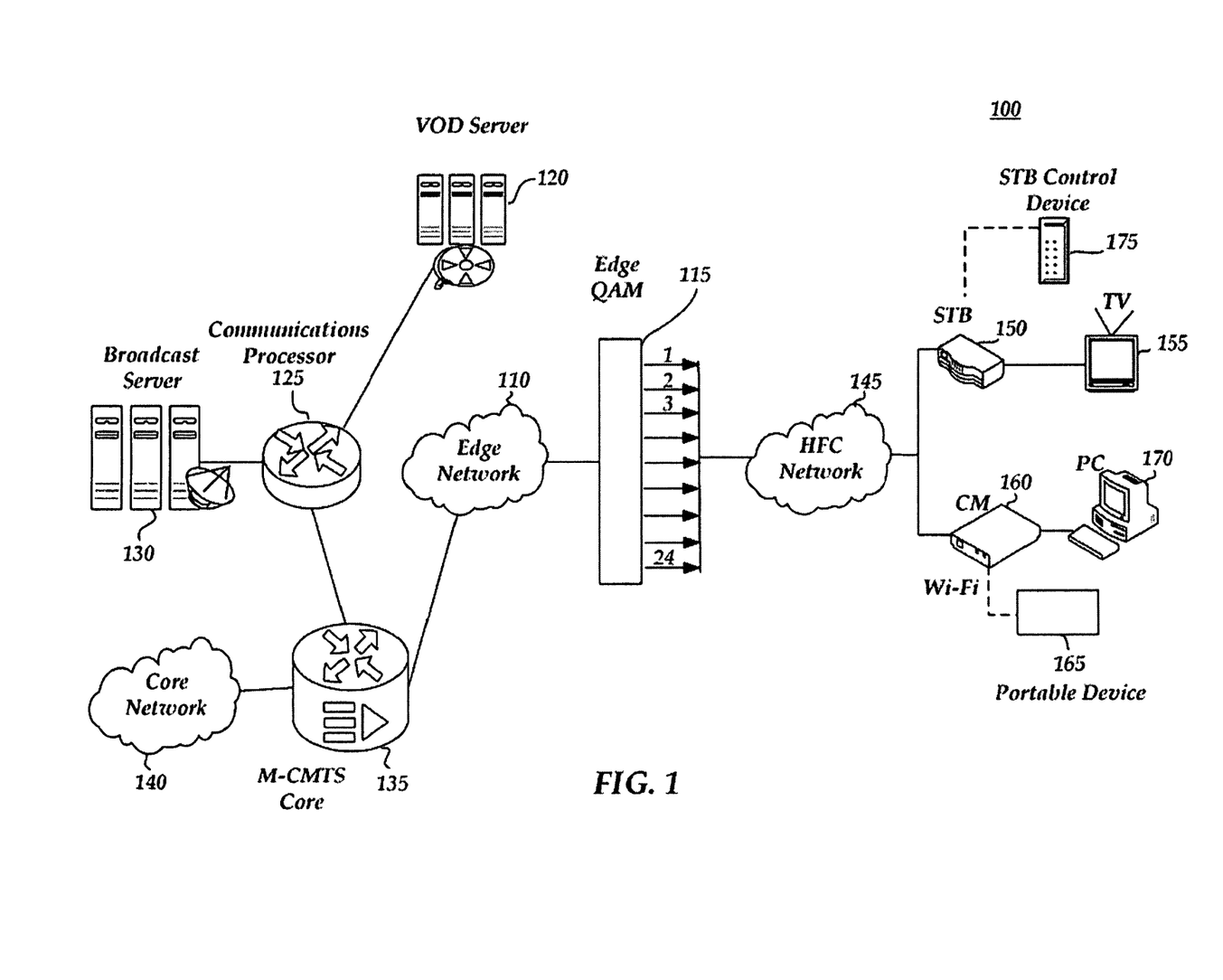
FIG. 1 is a block diagram of an operating environment including an application server.

FIG. 1 is a block diagram of a content delivery system 100. All or a portion of system 100 may be operated by a system operator. The system operator may comprise, but is not limited to, service provider such as a cable television service provider, for example. Consistent with embodiments of the present invention, system 100 may comprise an edge network 110, an edge quadrature amplitude modulation (QAM) device 115, a video-on-demand (VOD) server 120, a communications processor 125, a broadcast server 130, a modular cable modem termination system (M-CMTS) core 135, and a core network 140. In addition, system 100 may comprise, a hybrid fiber-coax (HFC) network 145, a set-top-box (STB) 150, a television (TV) 155, a cable modem (CM) 160, a portable device 165, a personal computer (PC) 170, and a STB control device 175. Communications processor 125 will be discussed in greater detail below with respect to FIG. 2.

Edge network 110 may comprise, a network providing, for example, full-duplex, two-way broadband services including broadband video and audio, cable television services, or telecommunications services. Edge network 110 may provide data by utilizing network data formats including, for example, i) Internet protocol (IP); ii) Ethernet; iii) digital subscriber line (DSL); iv) asynchronous transfer mode (ATM); and v) virtual private network (VPN). Edge network 110 may utilize managed network services. Edge network 110 may comprise various components including, for example, i) servers; ii) switches; iii) routers; iv) gateways; v) hubs; vi) fiber optic cable; vii) copper cable; and viii) terminations. The aforementioned are examples and edge network 110 may comprise other configurations for broadband service delivery and data switching over system 100.

Edge QAM 115 may provide modulation for various encoding formats (e.g. for data, audio, and video) and may distribute the signal down multiple broadband channels. Edge QAM 115 may modulate signals in, for example, multi-channel quadrature amplitude modulation. Edge QAM 115 may support broadcast and narrowcast with multi-program transport stream (MPTS) pass-through and single-program transport stream (SPTS) to MPTS multiplexing. Edge QAM 115 may meet data-over-cable service interface specification (DOCSIS) and downstream radio frequency interface (DRFI) performance specifications. Furthermore, edge QAM 115 may provide video over internet protocol and moving pictures expert group (MPEG) video simultaneously. Edge QAM 115 may provide various data switching functions and enable two-way, full-duplex communication within the broadband network. Edge QAM 115 may modulate and distribute broadcast multimedia services including, for example, i) a broadcast multi-media service; ii) a high-definition multimedia service; iii) a digital television multimedia service; iv) an analog multimedia service; v) a VOD service; vi) a streaming video service; vii) a multimedia messaging service; viii) a voice-over-internet protocol service (VoIP); ix) an interactive multimedia service; and x) an e-mail service. The aforementioned are examples and edge QAM 115 may comprise other configurations for different broadband and data services.

VOD server 120 may perform processes for providing video entertainment on demand. VOD server 120 may take MPEG compressed video off a hard disk or a networked service, format it into MPEG-TS packets inside a user datagram protocol (UDP) packet, and send it into edge network 110. Edge QAM 115 may receive the UDP packets, where Internet protocol (IP) encapsulation may be removed. The MPEG packets may be forwarded down one QAM channel on edge QAM 115 and onto HFC network 145.

Broadcast server 130 may perform processes for providing broadcast services. Broadcast server 130 may use a broadcast signal and a narrowcast signal to deliver broadcast services to a broadcast system. Broadcast server 130 may receive video, audio, and data from fiber optic input, wireless input, recorded tape, recorded digital video disc, or satellite input. Broadcast server 130 may utilize digital signal formats and analog signal formats. Furthermore, broadcast server 130 may comprise a specialized receiver and data switching equipment for broadband distribution including, for example, using switched digital technology for broadcast video delivery to digital set-tops. In addition, broadcast server 130 may provide broadband multimedia services including, for example, i) the broadcast multi-media service; ii) the high-definition multimedia service; iii) the digital television multimedia service; iv) the analog multimedia service; v) the VOD service; vi) the streaming video service; vii) the multimedia messaging service; viii) the voice-over-internet protocol service (VoIP); ix) the interactive multimedia service; and x) the e-mail service. The aforementioned are examples and broadcast server 130 may comprise other components and systems for providing broadcast services in system 100.

M-CMTS core 135 may receive IP datagrams from core network 140. M-CMTS core 135 may then forward these IP datagrams to either a single QAM channel within edge QAM 115 with traditional DOCSIS encapsulation, or may forward the IP datagrams to multiple QAM channels within edge QAM 115, for example, using DOCSIS bonding. M-CMTS core 135 may support DOCSIS features and end-to-end IP within a next generation network architecture (NGNA), for example.

Core network 140 may comprise any data or broadband network that may provide data and services to edge network 110, communications processor 125, broadcast server 130, or M-CMTS core 135. For example, core network 140 may comprise the Internet. In addition, core network 140 may comprise various components including, for example, i) servers; ii) switches; iii) routers; iv) gateways; v) hubs; vi) fiber optic cable; vii) copper cable; and viii) terminations. The aforementioned are examples and core network 140 may comprise other components and may supply other services using various other formats.

HFC network 145 may comprise a communications network (e.g. a cable TV network) that uses optical fiber, coaxial cable, or an optical fiber coaxial cable combination. Fiber in HFC network 120 may provide a high-speed backbone for broadband services. Coaxial cable may connect end users in HFC network 120 to the backbone. Such networks may use, for example, matching DOCSIS cable modems at a head end and at an end user's premises. Such a configuration may provide bi-directional paths and Internet access.

STB 150 may comprise a single component or a multi-component system for receiving broadband services. STB 150 may comprise a service consumer system combining several components including, for example, a set top box, cable modem 160, a network interface unit, a residential gateway, a terminal unit, a scrambler/descrambler, a digital storage media unit, an input/output port, a display device, a keyboard, and a mouse. STB 150 may encode and decode digital and analog signals, and provide interface capability for other components. STB 150 may utilize various operating systems and other software components. The end user's premises may contain STB 150. STB 150 may include all the functionality provided by a cable modem, such as CM 160, in one component and attach to TV 155, for example.

TV 155 may comprise an end use device for displaying delivered broadband services. TV 155 may comprise, for example, a television, a high definition television, a liquid crystal display unit (LCD), a video projection unit, or PC 170. The aforementioned are examples and TV 155 may comprise other display devices for delivered broadband services.

CM 160 may comprise, for example, a cable modem, a network server, a wireless fidelity data switch, or an Ethernet switch. CM 160 may provide data services to the user by accessing DOCSIS services from system 100. CM 160 may provide Internet access, video, or telephone services. The aforementioned are examples and CM 160 may comprise other data delivery devices.

Portable device 165 or PC 170 may comprise any personal computer, network switch, wireless switch, network hub, server, personal digital assistant, and home computing device. Portable device 165 or PC 170 may serve as user devices for data access from system 100. Portable device 165 and PC 170 may transmit and receive data and services from system 100.

STB control device 175 may comprise any input and output device for interfacing with STB 150. For example, STB control device 175 may be a remote control for using STB 150. STB control device 175, after proper programming, may interface with STB 150.

Furthermore, system 100 maybe configured to utilize Open Cable Applications Platform (OCAP.) OCAP was developed by Cable Television Laboratories, Inc. of Louisville, Colo. 80027-9750, as a common interactive TV platform. OCAP is a specification for a middleware software layer that enables application developers, interactive television services, and various other products to run interactive applications on content delivery system such as television systems.

Embodiments consistent with the invention may comprise a system for providing user communication. The system may comprise a memory storage and a processing unit coupled to the memory storage. The processing unit may be operative to receive a content group comprising a list of a plurality of content programs and to make a user selectable element corresponding to the content group available to a plurality of users. In addition, the processing unit may be operative to receive a first request associated with the user selectable element from a one of the plurality of users. The first request may indicate that the one of the plurality of users wants to receive the content group. Moreover, the processing unit may be operative to provide the content group to the one of the plurality of users in response to the first request. Furthermore, the processing unit may be operative to receive a second request from the one of the plurality of users for content corresponding to a one of the plurality of content programs listed in the content group and to provide the content to the one of the plurality of users in response to the second request.

Consistent with embodiments of the present invention, the aforementioned memory, processing unit, and other components may be implemented in a content delivery system, such as system 100 of FIG. 1. Any suitable combination of hardware, software, and/or firmware may be used to implement the memory, processing unit, or other components. By way of example, the memory, processing unit, or other components may be implemented with communications processor 125, in combination with system 100. The aforementioned system and processors are examples and other systems and processors may comprise the aforementioned memory, processing unit, or other components, consistent with embodiments of the present invention.

Figure 2:
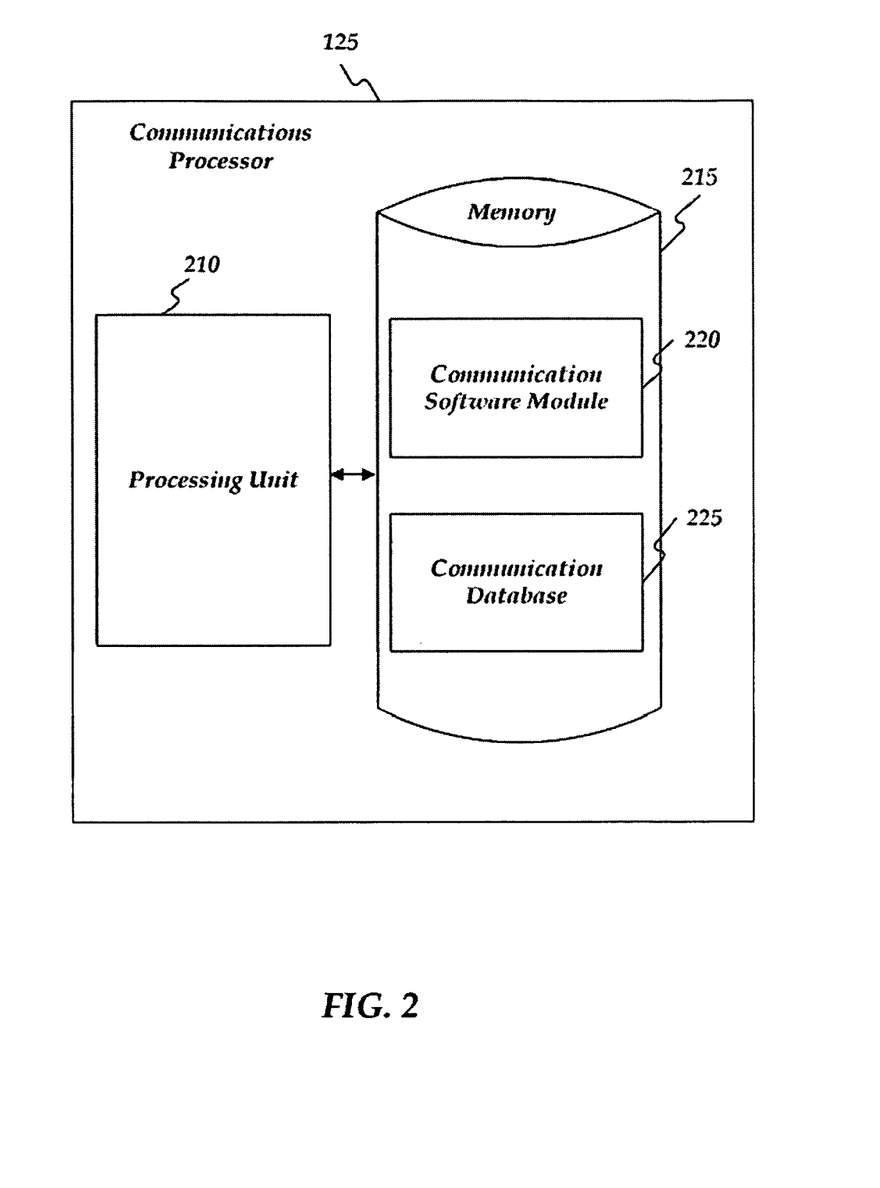
FIG. 2 is a block diagram of the communications processor.

FIG. 2 shows communications processor 125 of FIG. 1 in more detail. As shown in FIG. 2, communications processor 125 may include a processing unit 210 and a memory unit 215. Memory 215 may include a communication software module 220 and a communication database 225. While executing on processing unit 210, communication software module 220 may perform processes for providing a social network, including, for example, one or more stages included in method 300 described below with respect to FIG. 3. Furthermore, any communication software module 220 and communication database 225 may be executed on or reside in any element shown in FIG. 1.

Communications processor 125 ("the processor") may be implemented using a personal computer, a network computer, a mainframe, or other similar microcomputer-based workstation. The processor may comprise any computer operating environment, such as hand-held devices, multiprocessor systems, microprocessor-based or programmable sender electronic devices, minicomputers, mainframe computers, and the like. The processor may also be practiced in distributed computing environments where tasks are performed by remote processing devices. Furthermore, the processor may comprise a mobile terminal, such as a smart phone, a cellular telephone, a cellular telephone utilizing wireless application protocol (WAP), personal digital assistant (PDA), intelligent pager, portable computer, a hand held computer, a conventional telephone, a wireless fidelity (Wi-Fi) access point, or a facsimile machine. The aforementioned systems and devices are examples and the processor may comprise other systems or devices.

Figure 3:
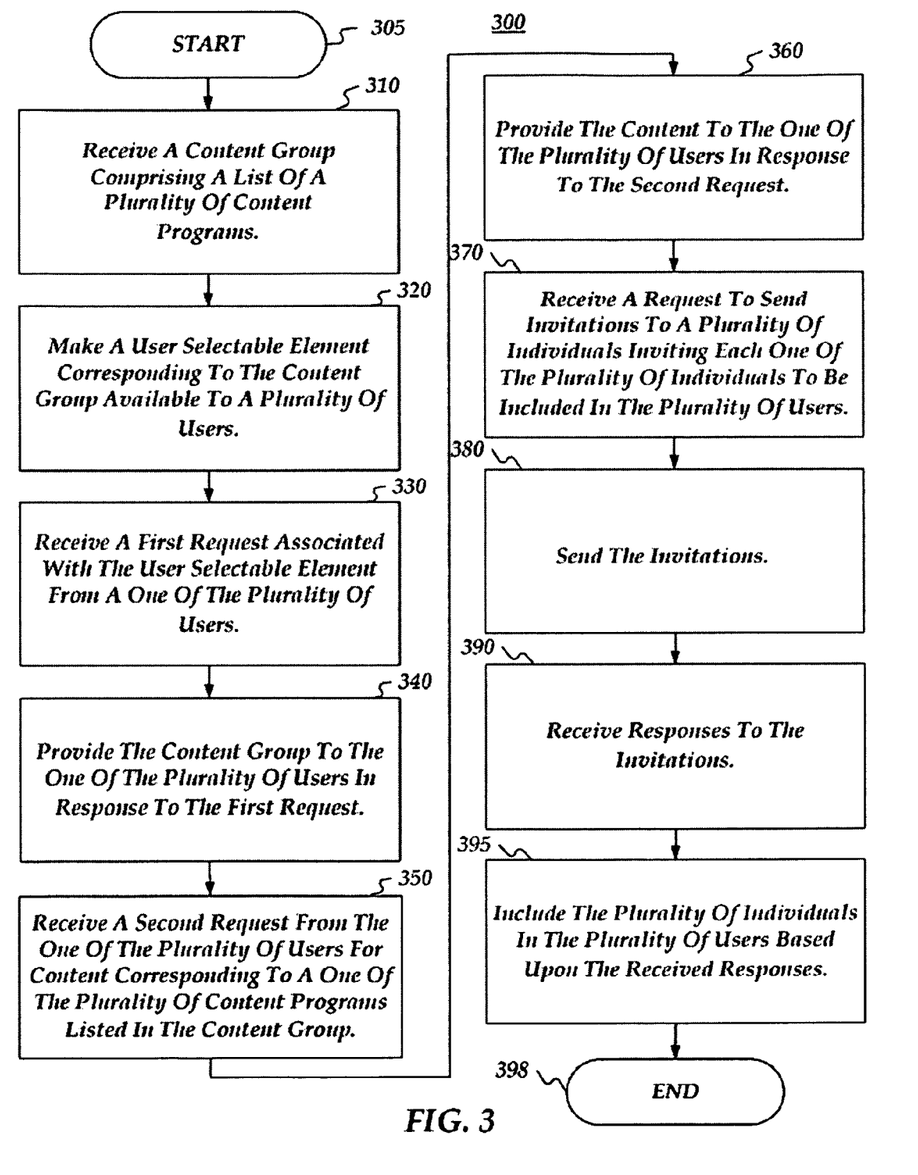
FIG. 3 is a flow chart of a method for providing a social network.

FIG. 3 is a flowchart setting forth the general stages involved in a method 300 consistent with an embodiment of the invention for providing a social network. Method 300 may be implemented using communications processor 125, as described above with respect to FIG. 2. Ways to implement the stages of method 300 will be described in greater detail below. Method 300 may begin at starting block 305 and proceed to stage 310 where communications processor 125 may receive a content group comprising a list of a plurality of content programs. For example, a subscriber to the social network may also be, but not limited to, a subscriber to HFC network 145. For example, the subscriber may have a subscription with a service provider (e.g. such as a cable television service provider) to use all or a portion of system 100. The subscriber, using STB 150, PC 170, or portable device 165 for example, may create the content group and transmit the content group to communications processor 125. The service provider may control or otherwise operate communications processor 125 and HFC network 145.

The content group may comprise a list of a plurality of content programs. For example, the content programs may comprise, but not limited to, television shows, movies, broadcast programming, VOD programming, music, and any content available over the internet. The aforementioned are examples, and the content programs may comprise any content type. One or more of the plurality of content programs may be provided through HFC network 145 to the subscriber to, for example, STB 150, portable device 165, or PC 170.

The plurality of content programs may comprise favorite programs of the subscriber. For example, the subscriber may enjoy watching a particular movie or television program. Consequently, the subscriber may desire to let others know of these favorite content programs. Accordingly, the subscriber may place these favorite content programs in the list of plurality of content programs comprising the content group.

In addition, a service provider may determine the list of plurality of content programs comprising the content group. For example, the service provider may have certain programming content that the service provider is promoting. In other words, the service provider may be providing a certain content that the service provider wants subscribers to receive or wants the subscriber to know is available. Consequently, the service provider may place in the list of plurality of content programs comprising the content group the certain programming content that the service provider is promoting.

In addition, a service provider may determine popularity of certain content provided, for example, by the service provider. For example, the service provider may determine popularity of certain programs popular in a certain predetermined geographic area or programs popular on the social network. Consequently, the service provider may place in the list of plurality of content programs comprising the content group the certain programs popular in a certain predetermined geographic area or programs popular on the social network.

From stage 310, where communications processor 125 receives the content group, method 300 may advance to stage 320 where communications processor 125 may make a user selectable element corresponding to the content group available to a plurality of users. For example, communications processor 125 may make a user selectable element available to a device being used by one or more of the plurality of users using STB 150, PC 170, or portable device 165. The plurality of users may comprise members of the social network to whom the subscriber or the service provider wants to communicate the content group. The plurality of users may comprise other subscribers to the service provider's services or may not comprise other subscribers to the service provider's service. Notwithstanding, the plurality of users may be designated by a subject (e.g. a person) comprising the subscriber to the social network.

The user selectable element may graphically or pictorially identify the subscriber. For example, the user selectable element may include the subscriber's picture or an avatar corresponding to the subscriber. Notwithstanding, the user selectable element corresponding to the content group may be made available to the plurality of users where the user selectable element may identify the subscriber. Furthermore, the user selectable element may provide information graphically or pictorially indicating a genre corresponding to the content group. For example, the user selectable element may indicate to a viewer of the user selectable element that the user selectable element corresponds to certain programs popular in a certain predetermined geographic area or programs popular on the social network. Moreover, the user selectable element may indicate to the viewer of the user selectable element that the user selectable element corresponds to certain programming content that the service provider is promoting.

In making the user selectable element available to the plurality of users, each one of the plurality of users may respectively be identified by the communications processor 125 by any of an e-mail address, a telephone number, or combination of a media access control (MAC) address and a username corresponding to ones of the plurality of users. Furthermore, in making the user selectable element available to the plurality of users, the user selectable element may be made available to the social network utilizing, for example, a full-duplex, two-way broadband network, a hybrid fiber-coax (HFC) network, a data network, the internet, a cable television network, and a telecommunications network. The aforementioned are examples and other may be used.

Once communications processor 125 makes the user selectable element available in stage 320, method 300 may continue to stage 330 where communications processor 125 may receive a first request associated with the user selectable element from one of the plurality of users. The first request may indicate that the one of the plurality of users wants to receive the content group. For example, one of the plurality of users using STB 150, PC 170, or portable device 165 may select the user selectable element made available to STB 150, PC 170, or portable device 165 by communications processor 125. Once the user selectable element is selected, the first request may be transmitted to communications processor 125 from one of STB 150, PC 170, or portable device 165 over, for example system 100. The first request may be transmitted to communications processor 125 over a portion of system 100 controlled by the service provider or over a portion not controlled by the service provider as described in more detail below.

After communications processor 125 receives the first request in stage 330, method 300 may proceed to stage 340 where communications processor 125 may provide the content group to the one of the plurality of users in response to the first request. For example, communications processor 125 may transmit the content group to one of STB 150, PC 170, or portable device 165 over, for example system 100. The content group may be transmitted to the one of the plurality of users by the service provider over a portion of system 100 controlled by the service provider or over a portion not controlled by the service provider. For example, the service provider may comprise a cable television service provider operating HFC network 145. In this case, the service provider may transmit the content group to the one of the plurality of users over HFC network 145 that may be controlled by the service provider. In addition, the service provider may transmit the content group to the one of the plurality of users over core network 140 (e.g. the internet.) Some or all of core network 140 may or may not be controlled or operated by the service provider. The HFC network 145 may be more secure to malicious activity than core network 140 (e.g. the internet) because HFC network 145 may comprise a closed data network controlled by the system operator as opposed to a more open data network such as the internet, for example.

Once communications processor 125 provides the content group in stage 340, method 300 may continue to stage 350 where communications processor 125 may receive a second request from the one of the plurality of users for content corresponding to a one of the plurality of content programs listed in the content group. For example, the one of the plurality of users may view the content group on one of STB 150, PC 170, or portable device 165. Upon viewing the content group, the one of the plurality of users may decide to view or otherwise receive one of the plurality of content programs within the content group. Consequently, the one of the plurality of users may send the second request from one of STB 150, PC 170, or portable device 165 over, for example, system 100 to communications processor 125. The second request may be transmitted to communications processor 125 over a portion of system 100 controlled by the service provider or over a portion not controlled by the service provider.

From stage 350, where communications processor 125 receives the second request, method 300 may advance to stage 360 where communications processor 125 may provide the content to the one of the plurality of users in response to the second request. For example, upon receiving the second request, communications processor 125 may transmit to one of STB 150, PC 170, or portable device 165 over, for example, system 100 content corresponding to the second request. The content may be transmitted to one of STB 150, PC 170, or portable device 165 over a portion of system 100 controlled by the service provider or over a portion not controlled by the service provider. For example, if the content comprises a broadcast program such as a television show, the service provider may provide the broadcast program in progress if it is currently being broadcast. The service provider may provide times and dates of the next showing if the broadcast program is not in progress. If the content comprises a pay-per-view or a video-on-demand content, the service provider may provide the content.

In some situations, the one of the plurality of users may not have rights to the content corresponding to the second request. For example, the content may comprise content associated with a premium service from the service provider to which the one of the plurality of users does not have a subscription. Furthermore, the content may be video-on-demand content for which the user does not have a subscription or for which the user has not paid a requisite fee. In this situation, rather than transmitting the content, communications processor 125 may transmit to one of STB 150, PC 170, or portable device 165 over, for example, system 100 information on how to subscribe to the premium service or on how to pay the requisite fee for the content. Upon satisfaction of the subscription or fee, communications processor 125 may transmit to one of STB 150, PC 170, or portable device 165 over, for example, system 100 content corresponding to the second request.

Once communications processor 125 provides the content in stage 360, (or prior to stage 310) method 300 may continue to stage 370 where communications processor 125 may receive, from the subject comprising the subscriber to the social network, a request to send invitations to a plurality of individuals inviting each one of the plurality of individuals to be included in the plurality of users. For example, as stated above, the plurality of content programs may comprise favorite programs of the subject. In other words, the subscribe may enjoy watching a particular movie or television program. Consequently, the subscriber may desire to let others know of these favorite content programs. Consequently, the subscriber my send the request to communications processor 125 to send invitations to a plurality of individuals inviting each one of the plurality of individuals to be included in the plurality of users (e.g. the social network.) The plurality of users may comprise friends or acquaintances the subscriber wishes to join the social network. The request may be transmitted to communications processor 125 over a portion of system 100 controlled by the service provider or over a portion not controlled by the service provider.

After communications processor 125 receives the request in stage 370, method 300 may proceed to stage 380 where communications processor 125 may send the invitations. For example, communications processor 125 may parse the received request and may create a plurality of invitations corresponding to the received request. Once the invitations are created, the invitations may be transmitted to each of the plurality of individuals over a portion of system 100 controlled by the service provider or over a portion not controlled by the service provider.

From stage 380, where communications processor 125 sends the invitations, method 300 may advance to stage 390 where communications processor 125 may receive responses to the invitations. For example, some or all of the plurality of individuals may decide to join the social network. Consequently, those of the individuals who decided to join the social network may send response to the invitations received.

Once communications processor 125 receives responses to the invitations in stage 390, method 300 may continue to stage 395 where communications processor 125 may include the plurality of individuals in the plurality of users based upon the received responses. For example, for those individuals who provided positive response to the invitations that those individuals wish to join the social network, communications processor 125 may include the plurality of individuals corresponding to the positive response in the plurality of users. After communications processor 125 includes the plurality of individuals in the plurality of users in stage 395, method 300 may then end at stage 398.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for providing a social network, the method comprising:
   receiving a content group comprising a list of a plurality of content programs, wherein receiving the list of the plurality of content programs comprises receiving the plurality of content programs on the list from a plurality of individuals of a social network in response to an invitation from a subscriber to the social network to create the content group;
   inserting, by an operator, content programs into the content group, wherein inserting the content programs by the operator comprises inserting:
      a first list of content programs popular on the social network,
      a second list of content programs popular in a predetermined geographic area, and
      a third list of content programs being promoted by the operator;
   making a user selectable element corresponding to the content group available to a plurality of users, wherein making the user selectable element corresponding to the content group available to the plurality of users comprises making the user selectable element available to identify a subscriber, and wherein making the user selectable element available to the plurality of users further comprises providing graphical information to the subscriber, the graphical information comprising an indication that the user selectable elements corresponds to: the first list of content programs popular on the social network, the second list of content programs popular in the predetermined geographical area, and the third list of content programs being promoted by the operator;
   receiving a first request indicating that one of the plurality of users wants to receive the content group; and
   providing the content group to the one of the plurality of users in response to the first request.

2. The method of claim 1, wherein receiving the content group comprises receiving the content group comprising the list of the plurality of content programs comprising favorite programs of each of the plurality of individuals.

3. The method of claim 1, wherein making the user selectable element corresponding to the content group available to the plurality of users comprises making the user selectable element corresponding to the content group available to the plurality of users wherein the plurality of users are designated by a subject comprising the subscriber to the social network.

4. The method of claim 1, wherein making the user selectable element corresponding to the content group available to the plurality of users comprises making the user selectable element corresponding to the content group available to the plurality of users, each one of the plurality of users being respectively identified by at least one of the following: an e-mail address, a telephone number, and combination of a media access control (MAC) address and a username.

5. The method of claim 1, wherein making the user selectable element corresponding to the content group available to the plurality of users comprises making the user selectable element corresponding to the content group available to the plurality of users over the social network utilizing one of the following: a full-duplex, two-way broadband network, a hybrid fiber-coax (HFC) network, a data network, the internet, a cable television network, and a telecommunications network.

6. The method of claim 1, wherein receiving the plurality of content programs on the list from the plurality of individuals of the social network in response to an invitation from a subscriber to the social network to create the content group comprises:
   receiving, from a subject comprising the subscriber to the social network, a request to send invitations to the plurality of individuals inviting each one of the plurality of individuals to be included in the plurality of users;
   sending the invitations;
   receiving responses to the invitations; and
   including the plurality of individuals in the plurality of users based upon the received responses.

7. The method of claim 1, wherein making the user selectable element corresponding to the content group available to the plurality of users further comprises making the user selectable element corresponding to the content group available to the plurality of users wherein the user selectable element provides information indicating a genre corresponding to the content group.

8. The method of claim 7, wherein making the user selectable element provide the information indicating the genre corresponding to the content group comprises making the user selectable element provide the information indicating the genre wherein the information is provided as one of: graphically and pictorially.

9. The method of claim 1, wherein inserting the content program into the content group comprises inserting the content program into the content group by a service provider of the content program.

10. The method of claim 1, wherein inserting the content program into the content group by a service provider of the content program comprises inserting the content program into the content group based on a popularity of the content program on another social network.

11. The method of claim 1, wherein making the user selectable element available to the plurality of users further comprises providing a pictorial indication along with the graphical indication.

12. The method of claim 1, wherein inserting the first list of content programs popular in the geographical area comprises:
   determining the content programs popular in each of a plurality of geographical areas;
   creating content groups comprising the content programs popular in each of the geographical areas; and
   inserting one of the content groups to a respective geographical area.

13. A non-transitory computer-readable storage medium which stores a set of instructions which when executed performs a method for providing a social network, the method executed by the set of instructions comprising:
   receiving a content group comprising a list of a plurality of content programs, wherein receiving the list of the plurality of content programs comprises receiving the plurality of content programs from a plurality of individuals of a social network in response to an invitation from a subscriber to the social network to create the content group;

inserting content programs selected by an operator into the content group, wherein inserting the content programs selected by the operator comprises inserting:
   a first list of content programs popular on the social network,
   a second list of content programs popular in a predetermined geographic area, and
   a third list of content programs being promoted by the operator;

making a user selectable element corresponding to the content group available to a first plurality of users that are subscribers to the social network, wherein making the user selectable element corresponding to the content group available to the plurality of users comprises making the user selectable element available to identify the subscriber, and wherein the user selectable element further comprises providing graphical information to the subscriber, the graphical information comprising an indication that the user selectable elements corresponds to: the first list of content programs popular on the social network, the second list of content programs popular in the predetermined geographical area, and the third list of the content programs being by the operator;

providing a message to a second plurality of users that are not subscribers to the social network, the message including the list of the plurality of content programs;

receiving a first request indicating that one of the first plurality of users wants to receive the content group; and providing the content group to the one of the first plurality of users in response to the first request.

14. The non-transitory computer-readable storage medium of claim 13, further comprising:
receiving a second request from the one of the first plurality of users that are subscribers to the social network for content corresponding to a one of the first plurality of content programs listed in the content group; and
providing the content to the one of the first plurality of users that are subscribers to the social network in response to the second request.

15. The non-transitory computer-readable storage medium of claim 13, wherein providing the message comprises providing the message inviting the second plurality of users that are not subscribers to the social network to join the social network.

16. The non-transitory computer-readable storage medium of claim 13, wherein receiving the content group comprising the list of the plurality of content programs comprises receiving the list of the plurality of content programs wherein the plurality of content programs are favorite programs of each of the plurality of individuals.

17. A system for providing a social network, the system comprising:
a memory storage; and
a processing unit coupled to the memory storage, wherein the processing unit is operative to:
   receive a content group comprising a list of a plurality of content programs, the content programs comprising at least one of the following: television shows, movies, broadcast programming, and Video On Demand (VOD) programming, wherein receiving the list of the plurality of content programs comprises receiving the plurality of content programs from a plurality of individuals of a social network in response to an invitation from a subscriber to the social network to create the content group;
   insert content programs comprising at least one of the following: a television show, a movie, a broadcast program, and a VOD program into the content group, wherein the processing unit being operative to insert the content programs comprises the processing unit being operative to insert:
      a first list of content programs popular on the social network,
      a second list of content programs popular in a predetermined geographic area, and
      a third list of content programs being promoted by the operator;
   make a user selectable element corresponding to the content group available to a first plurality of users that are subscribers to the social network, wherein the processor being operative to make the user selectable element corresponding to the content group available to the plurality of users comprises the processor being operative to:
      make the user selectable element available to identify the subscriber, and
      provide graphical information to the subscriber, the graphical information comprising an indication that the user selectable elements corresponds to: the first list of the plurality of content programs popular on an another social networks, the second list of content programs popular in the predetermined geographical area, and the third list of the content programs being inserted by the operator;
   receive a first request from a another subscriber to the social network, the first request indicating that other subscriber wants to receive the content group;
   determine that the other subscriber is not authorized to receive a portion of the content within the content group; and
   provide subscription information to the other user, the subscription information indicating how the other subscriber may subscriber to the portion of the content.

18. The system of claim 17, wherein the user selectable element provides information indicating a genre corresponding to the content group.

19. The system of claim 18, wherein the information indicating the genre is provided as one of the following: graphically and pictorially.

20. The system of claim 17, wherein the processor being operative to provide the graphical information further comprises the processor being operative to provide pictorial information along with the graphical information.

* * * * *